May 21, 1963  H. J. ZINK ETAL  3,090,258
EPICYCLIC GEAR TRANSMISSION WITH HERRINGBONE TEETH
Filed May 29, 1958  7 Sheets-Sheet 1

INVENTORS:
HEINRICH J. ZINK, ERICH JOHN
PAUL BÜTTNER
BY
Mostern & Rollin
ATTORNEYS May 21, 1963  H. J. ZINK ETAL  3,090,258
EPICYCLIC GEAR TRANSMISSION WITH HERRINGBONE TEETH
Filed May 29, 1958 7 Sheets-Sheet 3

INVENTORS:
HEINRICH ZINK, ERICH JOHN,
PAUL BÜTTNER
BY
Mestern & Kollin
ATTORNEYS May 21, 1963 H. J. ZINK ETAL 3,090,258
EPICYCLIC GEAR TRANSMISSION WITH HERRINGBONE TEETH
Filed May 29, 1958 7 Sheets-Sheet 7

INVENTORS:
HEINRICH ZINK, ERICH JOHN,
PAUL BÜTTNER
BY
Mestern & Kollin,
ATTORNEYS United States Patent Office 3,090,258
Patented May 21, 1963

3,090,258
EPICYCLIC GEAR TRANSMISSION WITH
HERRINGBONE TEETH
Heinrich Johann Zink, Goggingen, near Augsburg, and Erich John and Paul Büttner, Augsburg, Germany, assignors to Zahnraederfabrik Renk Aktiengesellschaft, Augsburg, Germany
Filed May 29, 1958, Ser. No. 738,691
Claims priority, application Germany Jan. 31, 1958
6 Claims. (Cl. 74—801)

Our present invention relates to a torque-transmitting system of the epicyclic-gear type in which a sun gear is coaxially surrounded by a ring gear and one or more planetary gears are disposed in an annular clearance between them.

It is known to provide the gears of such transmissions with so-called herringbone teeth, i.e. with two sets of helical teeth of opposite pitch, which serve to center the co-operating gears relatively to one another by virtue of the opposite axial thrusts developed at the complementary toothed portions in mesh with each other.

The general object of this invention is to provide a system of this character adapted to compensate dynamically for inaccurate tooth shapes that unavoidably occur during manufacture and give rise to stresses which, unless relieved, may result in objectionable vibration and noise. Our invention realizes this object by providing additional degrees of freedom for the members of the epicyclic gear train as more fully described hereinafter and set forth in the accompanying claims.

The device according to the invention will now be more fully described with reference to the accompanying drawing, but it should be understood that same is given solely by way of illustration and not of limitation and that many changes in the details may be made without departing from the spirit of the invention.

Figure 1:
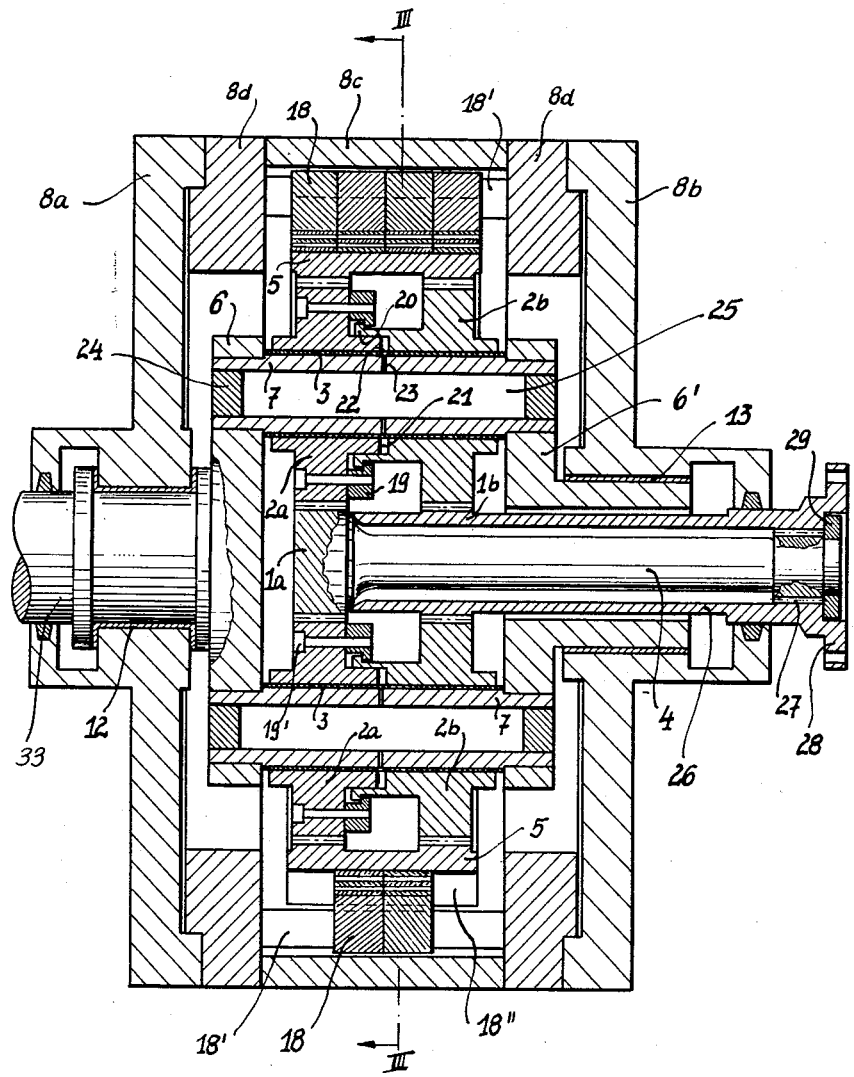
FIG. 1 shows a longitudinal section of an embodiment of a single-stage planetary-gear transmission with divided planet gears.
Figure 3:
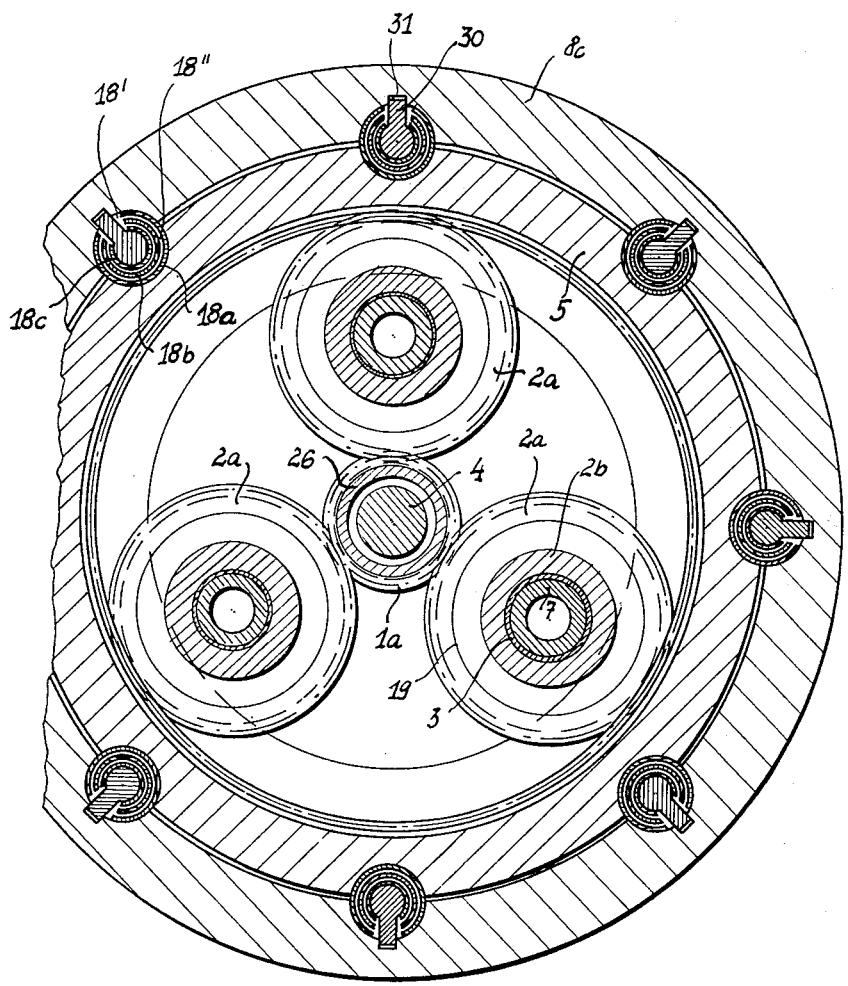
FIG. 3 shows a section along the line III—III in FIG. 1.

The embodiment of FIG. 1 illustrates a single-stage planetary-gear transmission wherein, in a housing consisting of bearing flanges $8a$ and $8b$ and of casing parts $8c$ and $8d$, a driven shaft 33 is axially immovable in a bearing 12. The driven shaft 33 forms an integral unit with the planet-gear support 6. In the other bearing 13, flange $6'$ of support 6 is mounted with axial play. Flange $6'$ and support 6 are connected by bearing pins 7 each having a bore 25, serving to bear the divided planet gears $2a$ and $2b$; it is immaterial, for purposes of the invention, how many planet gears $2a$, $2b$ are used. In FIG. 1 only two planet gears $2a$, $2b$ have been shown for clarity; as shown in FIG. 3, however, three planet gears spaced 120° apart may also be used. The component gears $2a$ and $2b$ are helical gears, axially displaceable relatively to each other on bushings 3. One component gear, $2a$, is fixedly connected to a coupling collar 19 by bolts $19'$. The collar 19 embraces a shoulder 20 provided on the other component gear, $2b$, so that collar 19 and shoulder 20 form a stop preventing axial separation of component gears $2a$ and $2b$. Also, both the component gears $2a$, $2b$ have bearing play with respect to the bushing 3. Shoulder 20 also encloses a space 21, provided between the two component gears $2a$, $2b$, into which lubricant occupying the interior of bearing pin 7 can penetrate through openings 22 and 23 under centrifugal force. This sets up a lubricant pressure in space 21, tending to thrust the component gears $2a$, $2b$ apart. The stresses due to tooth inaccuracies, together with the lubricant pressure, thus produce a constant cushioning action which prevents vibration of the planet gears $2a$, $2b$. The lubricant-containing space 25 of each pin 7 is closed at its end by plugs 24.

The planet gears $2a$, $2b$, in the embodiment of FIG. 1, are driven by a divided sun gear constituted by externally toothed shaft portions $1a$, $1b$. Part $1a$ of the sun gear, meshing with component gears $2a$, is integral with a solid shaft 4, whereas the other part $1b$ of the sun gear is integral with a hollow shaft 26 enclosing shaft 4 and forming therewith a central body. A joint 27 positively interconnects solid shaft 4 and hollow shaft 26 near a flange 28 for joint rotation. This flange 28 is connected to the drive shaft, not shown. By virtue of the torsional deformability of shaft 4, sun-gear parts $1a$ and $1b$ are capable of executing limited rotary movements relative to each other, so that the inner sun gear $1a$, $1b$, acting as axial guiding gear in this embodiment, has one degree of freedom in peripheral direction. A clip 29 secures the shaft 4 against axial displacement relative to shaft 26.

The ring gears 5, shown in each of FIGS. 1 to 6, are in each instance elastically supported against the housing $8c$ by interposition of members damping its free movement, in the form of sets of springs 18. These springs 18 are accommodated in recesses $18'$ and $18''$ of housing $8c$ and ring gear 5, and they permit a yielding movement of the ring gear in circumferential and radial direction as well as in tilting fashion.

Figure 2:
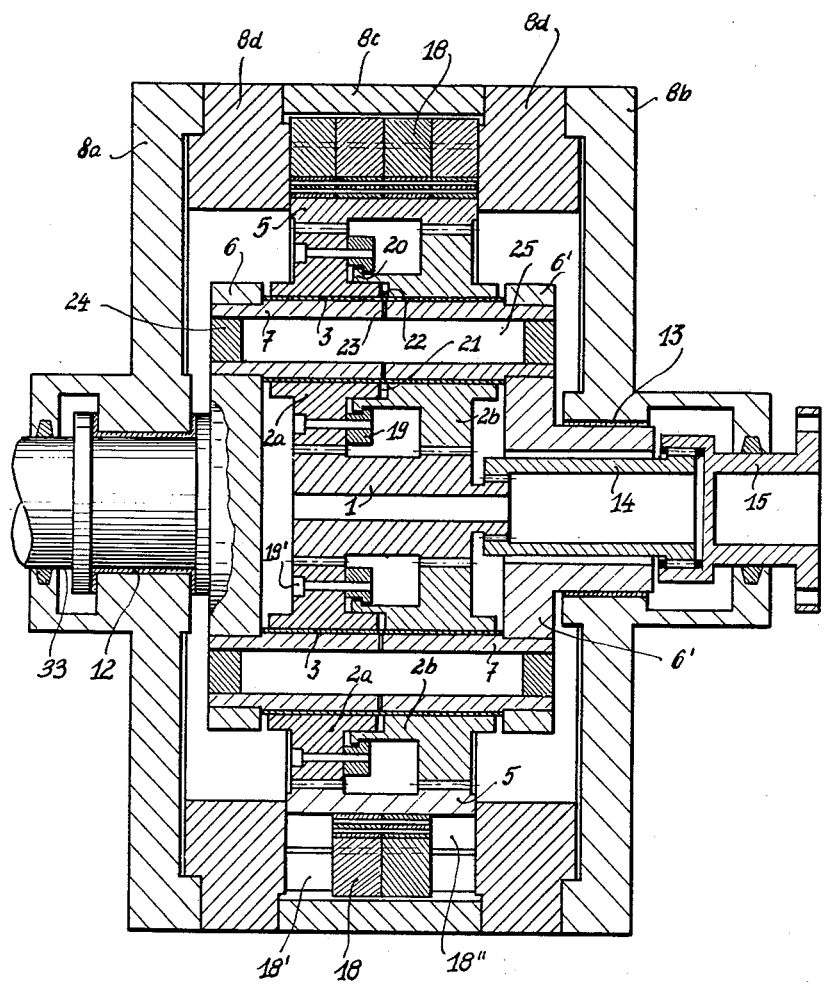
FIG. 2 shows a modified embodiment similar to FIG. 1.

FIG. 2 shows a modification of the embodiment in FIG. 1, illustrating that, instead of the divided sun gear $1a$, $1b$, an undivided bearingless or floating sun gear 1 may be provided. This sun gear 1 is flexibly connected to the drive shaft by a double gear coupling 14. In the case of FIG. 2, the ring gear 5 serves as axial guide gear, and therefore no spring-loaded guide rings are provided on its faces as is the case in the embodiment of FIG. 4.

In FIG. 3, the spring keys 18 are shown to comprise cylindrical leaf springs $18a$, $18b$, $18c$, nested in any desired number and retained by pins 30 engaging suitable grooves 31 in housing $8c$. These pins 30 at the same time provide a backing for springs $18a$, $18b$, $18c$, to protect them against breakage. The innermost spring $18c$ is preferably the thickest, the thickness of the other springs diminishing progressively towards the outside.

Figure 4:
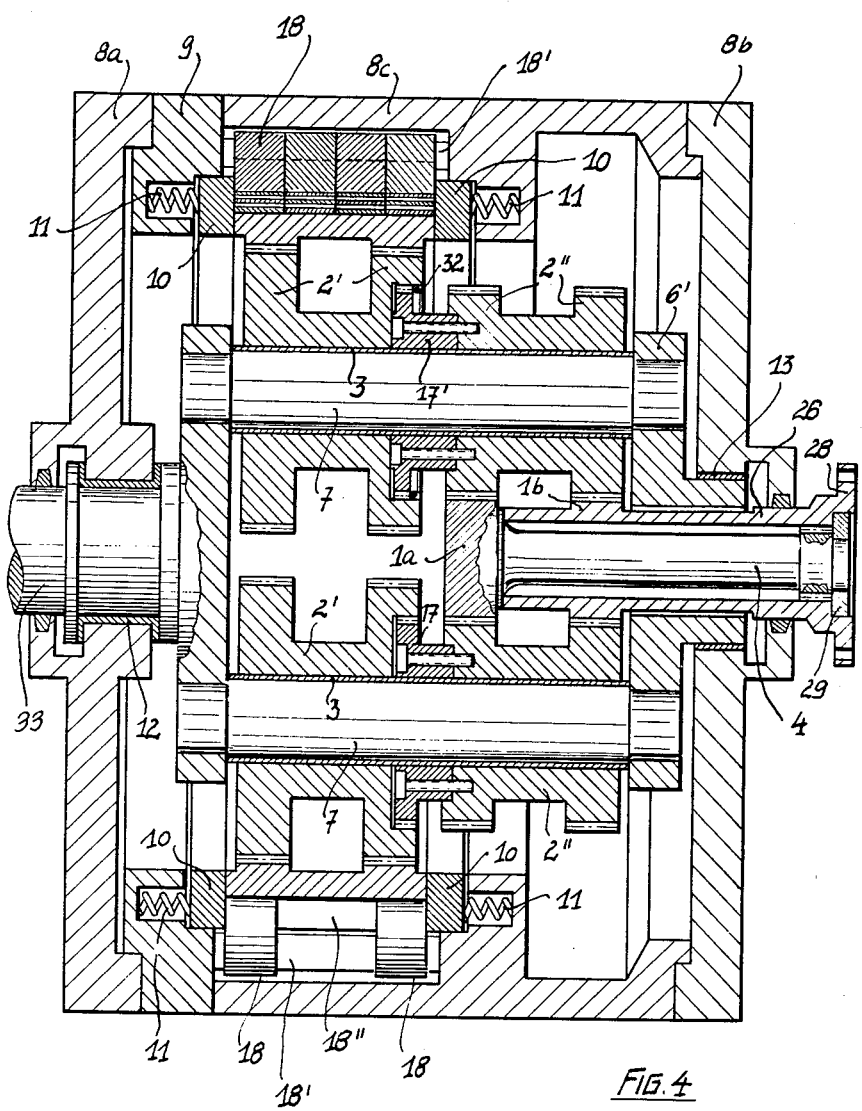
FIG. 4 shows a longitudinal section, similar to FIG. 1, of a two-stage planetary gear with gear couplings provided between the planet gears.

As shown in FIGS. 1, 2 and 4, several sets of springs 18 may be inserted one after another in recesses $18'$ and $18''$. By varying the number of spring sets 18, it is thus possible to vary the yielding elasticity of the ring gear 5.

Figure 5:
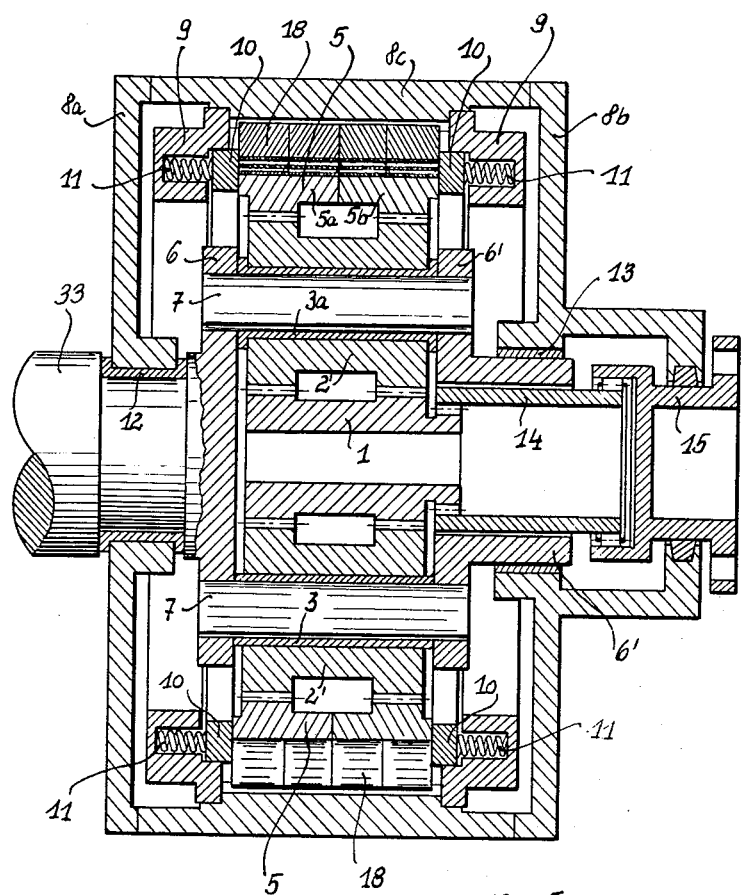
FIG. 5 shows a longitudinal section similar to FIG. 1 with undivided planet gears.

In FIGS. 4 and 5, an axial damping of yielding movements of the ring gear 5 is obtained by providing a ring 10 on each side in a housing part 9, these rings pressing constantly against the faces of annular gear 5 under the action of a plurality of compression springs 11.

As FIG. 1 shows, however, such rings 10 are not essential. They are especially appropriate when tooth inaccuracies are reflected predominantly in axial loads on the internal teeth of ring gear 5.

FIG. 4 further illustrates a two-stage planetary-gear assembly in which the planet gears $2'$ and $2''$ of the respective stages are undivided, whereas the corresponding planet gears of the two stages are connected to each other by gear couplings 17, 17'. Whereas coupling 17', with the aid of a spacer ring 32, prevents relative axial movement of one pair of associated planet gears 2' and 2", a respective coupling 17 permits axial compensating movements of all the other pairs of planet gears 2' and 2". In this case, also, planet gears 2' and 2" have a radial degree of freedom due to bearing play. Also, the gear couplings 17, 17' permit minor relative angular displacements. The axial guide gear, as previously shown in the embodiment of FIG. 1, is the inner sun gear 1a, 1b.

How the axial guide gear may alternatively be a planet gear 2' is illustrated in FIG. 5. Here, then, one planet gear 2' is not divided, and is axially guided by bushing 3a; nevertheless, it has a radial degree of freedom due to bearing play. The other planet gears 2' are axially movable. The guided planet gear 2' automatically regulates the two sun gears. For this purpose, the inner sun gear 1 is flexibly connected to the drive shaft via gear coupling 14 and flange 15. Since this sun gear 1 is bearingless, being supported merely on planet gears 2', it has radial and axial degrees of freedom, and can also assume slightly oblique positions.

The ring gear 5 consists of two helical half-gears 5a and 5b, which upon completed assembly are fixedly joined together by bolting. Half-gears 5a and 5b thus have no independent function, being divided merely as an aid to assembly. In the embodiment of FIG. 5, also, rings 10 are provided on the faces of the ring gear 5 which together with the sets of springs 18 permit an elastic suspension of ring gear 5 relative to the housing.

Figure 6:
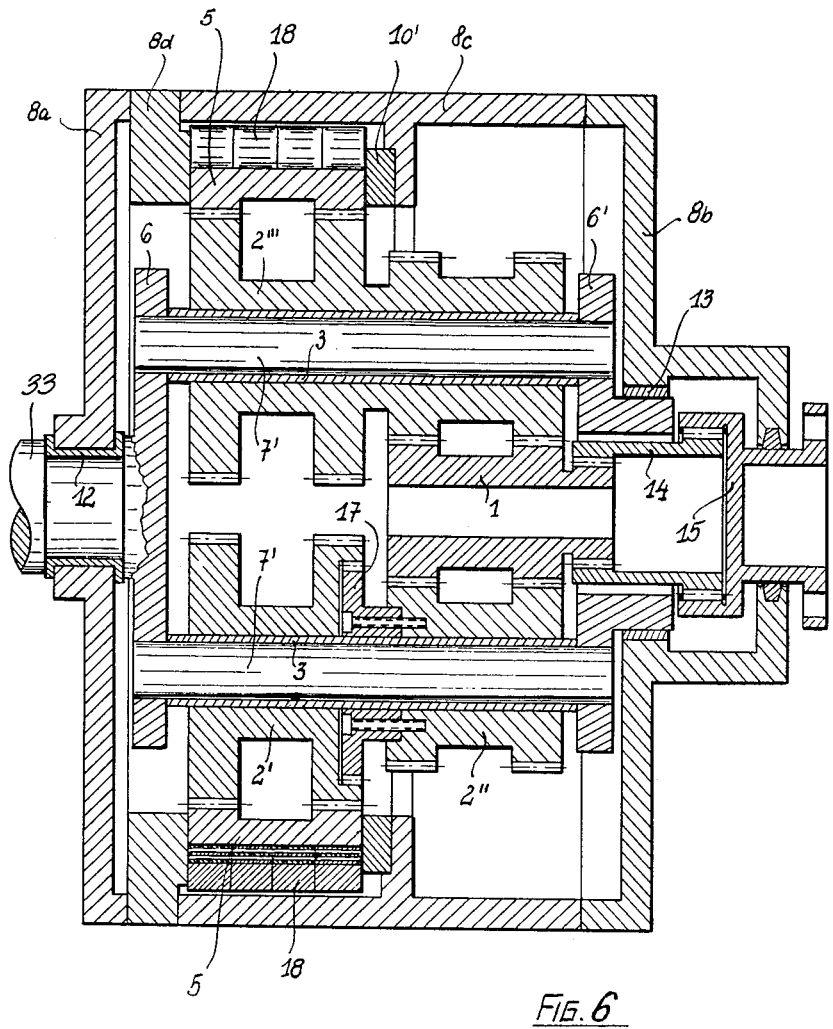
FIG. 6 shows a modified embodiment similar to FIG. 4.

FIG. 6 in a variant of the embodiment according to FIG. 4, illustrates an arrangement according to the invention in a two-stage planetary gear assembly wherein two planet gears 2''', one from each stage, are integral with each other, while the other planet gears 2' and 2" are connected together for positive rotative entrainment by means of gear couplings 17, but able to execute axial movements relative to each other. The sun gear 1, as in the embodiment of FIG. 5, is flexibly connected to the drive shaft, but in FIG. 6 the ring gears acts as the axial guide gear, the ring 10' not being spring-mounted in the housing in this instance. Thus the ring gear 5 has degrees of freedom in radial and peripheral direction only, by virtue of the sets of springs 18. The axial guiding of the second stage is here transmitter to the first stage via the rigid pair of planet gears 2'''.

In the case of each of the embodiments shown, the sun and ring gears 1, 5, when transmitting a torque, will adjust themselves to equal load distribution in the region of meshing. Now if the planet gears 2 were undivided and the ring gear 5 were axially fixed, then by reason of inaccuracies of fabrication the sun gear 1 would become displaced eccentrically and at an angle to the axis of rotation until a uniform distribution of forces was achieved. This displacement, repeating itself periodically at every revolution, would produce dynamic forces on the part of the rapidly rotating sun gear 1, and jeopardize smooth operation. This situation is dealt with, however, according to the invention, in that some of the inaccuracy is compensated, for example, in the bipartite planet gears 2a, 2b, some more of it by the angularly movable ring gear 5, and a minor portion of it, not sufficient by itself to impair performance, by the flexible connection of the sun gear 1 to the drive shaft. All gears of the train thus participate in the equalization. This reduces the component errors to be absorbed by the individual members of the system to a point where the transmission will run smoothly.

As the present disclosure also makes plain this type of compensation may be applied to other types of planetary gears, as for example two-stage gears, such as are required when the needed reduction exceeds 12:1.

Figure 7:
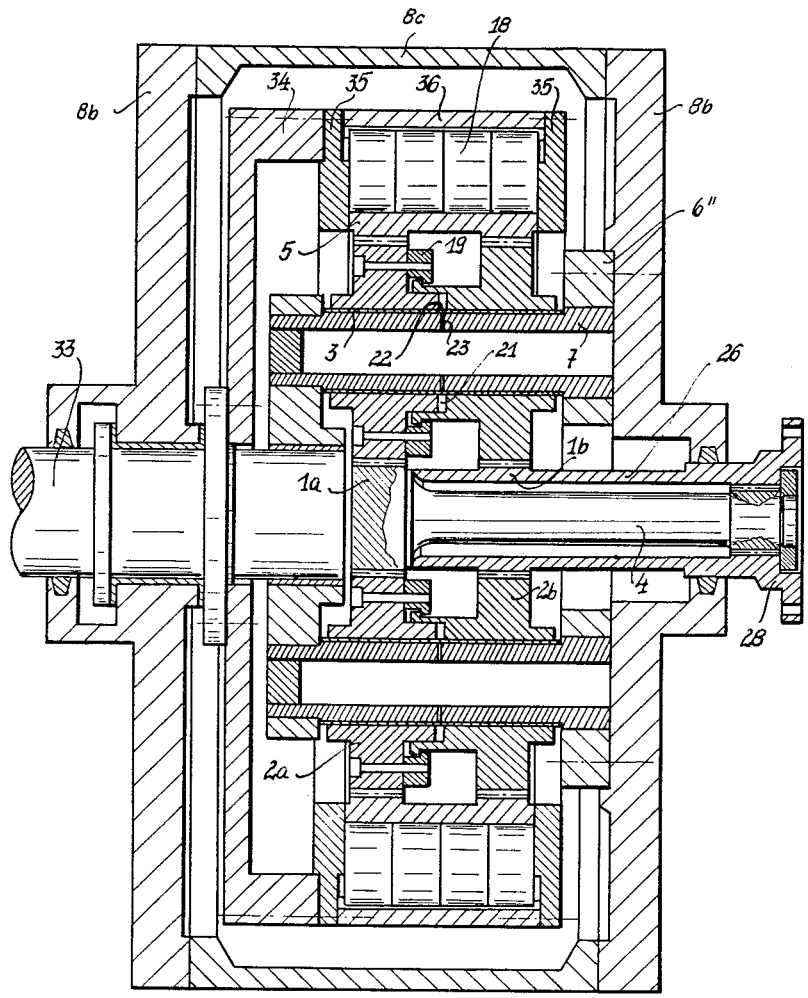
FIG. 7 shows a longitudinal section of a gear in which the planet transmission support is fixed.

As FIG. 7 shows, the principle underlying the invention may also be applied to a planetary-gear transmission wherein the planet-gear support 6" is fixedly connected to the housing 8b, so that the ring gear 5 revolves and drives the driven shaft 33. The rim of the ring gear 5 is enclosed with clearance by a concentric housing part 36 and axially retained, with or without play, by face rings 35. Between part 36 and ring gear 5, elastic members 18 are inserted for transmitting the torque of gear 5 to part 36 and hence to driven shaft 33, since part 36 is fixedly connected to driven shaft 33 by flange 34. The axial guide gear is in this case the ring gear 5, having little or no play relative to rings 35. Sun-gear portions 1a, 1b are resiliently interconnected, for limited relative rotation, by the same resilient torsional connection 4, 26 as in FIGS. 1 and 4.

What we claim is:

1. An epicyclic gear system for the transmission of power from a drive shaft to a driven shaft, comprising three coaxial and relatively rotatable members including a support, a ring member and a central member surrounded with clearance by said ring member, an external gear on said central member, an internal gear on said ring member, a set of planetary gears journaled at angularly spaced locations on said support in mesh with both said external and internal gears, each of said gears being axially subdivided into at least one pair of rotatively interconnected helically toothed portions of opposite pitch and equal diameter respectively engaging corresponding portions of the gears in mesh therewith, and housing means holding one of said members along with each gear carried thereon against major angular displacement, the toothed portions of at least one of said gears other than said planetary gears being interconnected against relative axial displacement, the toothed portions of each of said planetary gears being axially displaceable relatively to each other and being provided with interlocking attachments positioned for mutual engagement upon a predetermined maximum axial separation of the planetary-gear portions.

2. An epicyclic gear system for the transmission of power from a drive shaft to a driven shaft, comprising three coaxial and relatively rotatable members including a support, a ring member and a central member surrounded with clearance by said ring member, external gear means on said central member, internal gear means on said ring member and planetary gear means on said support, said planetary gear means meshing with both said external and internal gear means, each of said gear means being axially subdivided into two rotatively interconnected helically toothed portions of opposite pitch and equal diameter respectively engaging corresponding portions of the gear means in mesh therewith, housing means holding one of said members along with the gear means carried thereon against major angular displacement, the toothed portions of at least one of said gear means other than said planetary gear means being interconnected against relative axial displacement, the toothed portions of said planetary gear means being axially displaceable relatively to each other and to the toothed portions in mesh therewith, said central member comprising a pair of coaxial and relatively torsionable shafts including an inner shaft and a surrounding tubular shaft, said coaxial shafts being rigidly linked together at one of their ends and respectively carrying at their other ends the portions of said external gear means with freedom of limited relative angular displacement.

3. An epicyclic gear system for the transmission of power from a drive shaft to a driven shaft, comprising a housing, a ring gear within said housing, resilient coupling means on said housing engaging said ring gear and enabling limited angular displacement of the latter against the force of said coupling means, a central member coaxial with said ring gear including an elongated torsionable element and a surrounding tubular element forming a rigid joint at one of their ends, a pair of central helically toothed gear portions of like diameter and opposite pitch coaxially carried on the other ends of said elements, respectively, connecting means rigid with said joint for coupling said central member to one of said shafts, a rotatable carrier in said housing having means for coupling it with the other of said shafts, said ring gear being divided into two rigidly interconnected helically toothed gear portions of like diameter and opposite pitch respectively aligned with said central gear portions and surrounding same with clearance, and a plurality of planetary gears journaled on said carrier at angularly spaced locations, each of said planetary gears consisting of a pair of helically toothed coaxial portions of like diameter and opposite pitch respectively meshing with corresponding portions of said ring gear and with said central gear portions, the coaxial portions of each of said planetary gears being axially displaceable relatively to each other.

4. A gear system according to claim 3 wherein the pair of portions of each of said planetary gears are provided with interlocking formations positioned for mutual engagement upon a predetermined maximum axial separation of said pair of portions, further comprising pressure-exerting means coupled with said planetary gears for yieldably urging the portions of each pair toward said maximum axial separation.

5. An epicyclic gear system for the transmission of power from a drive shaft to a driven shaft, comprising three coaxial and relatively rotatable members including a support, a ring member and a central member surrounded with clearance by said ring member, external gear means on said central member, internal gear means on said ring member and planetary gear means on said support, said planetary gear means meshing with both said external and internal gear means, each of said gear means being axially subdivided into two rotatively interconnected helically toothed portions of opposite pitch and equal diameter respectively engaging corresponding portions of the gear means in mesh therewith, housing means holding one of said members along with the gear means carried thereon against major angular displacement, the toothed portions of at least one of said gear means other than said planetary gear means being interconnected against relative axial displacement, the toothed portions of said planetary gear means being axially displaceable relatively to each other and to the toothed portions in mesh therewith, and a resilient joint interconnecting the toothed portions of one of said gear means other than said planetary gear means with freedom of limited relative rotation.

6. An epicyclic gear system for the transmission of power from a drive shaft to a driven shaft, comprising three coaxial and relatively rotatable members including a support, a ring member and a central member surrounded with clearance by said ring member, external gear means on said central member, internal gear means on said ring member and planetary gear means on said support, said planetary gear means meshing with both said external and internal gear means, each of said gear means being axially subdivided into two rotatively interconnected helically toothed portions of opposite pitch and equal diameter respectively engaging corresponding portions of the gear means in mesh therewith, housing means holding one of said members along with the gear means carried thereon against major angular displacement, the toothed portions of at least one of said gear means other than said planetary gear means being interconnected against relative axial displacement, the toothed portions of said planetary gear means being axially displaceable relatively to each other and to the toothed portions in mesh therewith, and a resilient joint interconnecting the toothed portions of said external gear means with freedom of limited relative rotation.

References Cited in the file of this patent

UNITED STATES PATENTS

| | | |
|---|---|---|
| 1,475,902 | Thompson | Nov. 27, 1923 |
| 2,066,223 | Pielstick | Dec. 29, 1936 |
| 2,095,794 | Corbin | Oct. 12, 1937 |
| 2,481,290 | Clark et al. | Sept. 6, 1949 |
| 2,496,857 | Cornstedt et al. | Feb. 7, 1950 |
| 2,591,743 | Thompson | Apr. 8, 1952 |
| 2,700,311 | Bade | Jan. 25, 1955 |
| 2,703,021 | Stoeckicht | Mar. 1, 1955 |
| 2,737,064 | Stoeckicht | Mar. 6, 1956 |
| 2,759,376 | Chamberlin | Aug. 21, 1956 |
| 2,844,052 | Stoeckicht | July 22, 1958 |
| 2,868,040 | Chamberlin | Jan. 13, 1959 |

FOREIGN PATENTS

| | | |
|---|---|---|
| 958,710 | France | Sept. 19, 1949 |